United States Patent [19]
Bossert et al.

[11] 3,764,683
[45] Oct. 9, 1973

[54] COMPOSITION AND METHOD FOR EFFECTING CORONARY DILATION USING CYANOPHENYL-1,4-DIHYDROPYRIDINE DERIVATIVES

[75] Inventors: Friedrich Bossert, Wuppertal-Elberfeld; Wulf Vater, Opladen, both of Germany

[73] Assignee: Bayer Aktiengesellschaft, Leverkusen, Germany

[22] Filed: Aug. 6, 1971

[21] Appl. No.: 169,825

Related U.S. Application Data
[62] Division of Ser. No. 97,338, Dec. 10, 1971, Pat. No. 3,691,177.

[30] Foreign Application Priority Data
Dec. 17, 1969  Germany................. P 19 63 188.0

[52] U.S. Cl. ............................................... 424/263
[51] Int. Cl................................................... A61k 27/00
[58] Field of Search...................................... 424/263

[56] References Cited
UNITED STATES PATENTS

| | | | |
|---|---|---|---|
| 3,325,505 | 6/1967 | Loev............................ | 260/295.5 R |
| 3,441,648 | 4/1969 | Loev et al.................... | 260/295.5 R |
| 3,485,847 | 12/1969 | Bossert et al. ............... | 260/295.5 R |
| 3,455,945 | 7/1969 | Loev............................ | 424/263 |
| 3,488,359 | 1/1970 | Bossert........................ | 260/295.5 |
| 3,511,847 | 5/1970 | Loev et al.................... | 260/295.5 R |

*Primary Examiner*—Jerome D. Goldberg
*Attorney*—Jacobs and Jacobs

[57] ABSTRACT

Cyanophenyl-1,4-dihydropyridine derivatives of the formula:

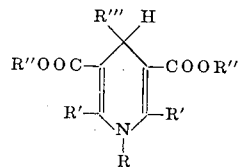

wherein
  R is hydrogen, saturated or unsaturated, straight, branched or cyclic alkyl of 1 to 6 carbon atoms, unsubstituted or substituted by hydroxyl or alkoxy of one to three carbon atoms, or benzyl or phenethyl unsubstituted or substituted in the aryl moiety by 1, 2 or 3 members selected from the group consisting of one to three alkoxy moieties of one to three carbon atoms, one or two alkyl moieties of one to three carbon atoms and one or two halogen atoms,
  R' is straight or branched chain alkyl of one to four carbon atoms,
  R'' is straight, branched, cyclic, saturated or unsaturated alkyl of one to six carbon atoms, said alkyl interrupted by one or two oxygen atoms or said alkyl substituted by hydroxyl, and
  R''' is aryl substituted by cyano or by cyano and one to nine members selected from the group consisting of cyano, nitro, amino, acylamino of one to two carbon atoms, hydroxyl, acyloxy of one to two carbon atoms, one or two alkyl moieties of one to four carbon atoms, one or two alkoxy moieties of one to four carbon atoms, and one or two halogen atoms, are useful for their coronary dilating effect and antihypertensive effects. Processes for the production of these compounds are set forth below.

30 Claims, No Drawings

COMPOSITION AND METHOD FOR EFFECTING CORONARY DILATION USING CYANOPHENYL-1,4-DIHYDROPYRIDINE DERIVATIVES

CROSS-REFERENCE

This is a division of Ser. No. 97,338, filed Dec. 10, 1971, now U.S. Pat. No. 3,691,177.

The present invention is concerned with 1,4-dihydropyridine derivatives. More particularly, the present invention is concerned with cyanophenyl-1,4-dihydropyridine derivatives of the formula:

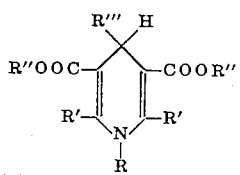

wherein

R is hydrogen saturated or unsaturated, straight, branched or cyclic alkyl of one to six carbon atoms, unsubstituted or substituted by hydroxyl or alkoxy of one to three carbon atoms, or benzyl or phenethyl unsubstituted or substituted in the aryl moiety by 1, 2 or 3 members selected from the group consisting of one to three alkoxy moieties of one to three carbon atoms, one or two alkyl moieties of one to three carbon atoms and one or two halogen atoms, especially fluorine, chlorine or bromine, R' is straight or branched chain alkyl of one to four carbon atoms, R'' is straight, branched, cyclic, saturated or unsaturated alkyl of one to six carbon atoms, said alkyl interrupted by one or two oxygen atoms or said alkyl substituted by hydroxyl, and R''' is aryl substituted by cyano or by cyano and one to 9 members selected from the group consisting of cyano, nitro, amino, acylamino of one to two carbon atoms, hydroxyl, acyloxy of one to two carbon atoms, one or two alkyl moieties of one to four carbon atoms, one or two alkoxy moieties of one to four carbon atoms, and one or two halogen atoms, especially fluorine, chlorine or bromine.

These compounds are especially useful for their coronary dilating effect and their antihypertensive effect, and when administered for these purposes, the compounds of the present invention are administered in the same general manner and amount as known coronary dilators and known antihypertensives.

The compounds of the present invention may be produced by reacting an aldehyde of the formula:

R''' — CHO wherein R''' is as above defined,
with an acyl-fatty acid ester of the formula:

wherein R' and R'' are as above defined,
and ammonia or an amine of the formula:

H₂N — R or a salt thereof, wherein R is as above defined, or with an enamine of the formula:

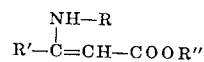

wherein R, R' and R'' are as above defined, in an organic solvent, such as an alcohol, dioxane, glacial acetic acid, dimethylformamide, dimethylsulphoxide or acetonitrile or in water at elevated temperatures, preferably at the boiling point of the solvent.

When the compounds of the present invention are produced, wherein R is other than hydrogen, a preferred embodiment of the process, comprises carrying out the reaction in pyridine. This general process is described in German patent application No. P 19 23 990.8 which corresponds to U.S. application Ser. No. 35,574 filed May 7, 1970.

It is further possible to produce the compounds of the present invention according to teachings set forth in Helv. Chim. Acta 41, (1958) 2066, by oxidizing 1,4-dihydropyridines, wherein R is hydrogen, with an oxidizing agent, quaternizing the resulting pyridine derivatives with alkyl esters and reducing these again with suitable reducing agents to form 1,4-dihydropyridines.

The following specific compounds are representative but not exhaustive examples of the various reactants which can be used according to the present invention:

Aldehydes:

2-, 3- or 4-cyanobenzaldehyde, 2-nitro-4-cyanobenzaldehyde, 2-nitro-3-hydroxy-4-cyanobenzaldehyde, 4-chloro-3-cyano-benzaldehyde.

Acyl-fatty Acid Esters:

Formylacetic acid ethyl ester, formylacetic acid butyl ester, acetoacetic acid methyl ester, acetoacetic acid ethyl ester, acetoacetic acid propyl ester, acetoacetic acid isopropyl ester, acetoacetic acid butyl ester, acetoacetic acid (α- or β)-hydroxyethyl ester, acetoacetic acid (α- or β)-methoxyethyl ester, acetoacetic acid (α- or β)-ethoxyethyl ester, acetoacetic acid (α- or β)-propoxyethyl ester, acetoacetic acid furfuryl ester, acetoacetic acid tetrahydrofurfuryl ester, acetoacetic acid allyl ester, acetoacetic acid propargyl ester, acetoacetic acid cyclohexyl ester, propionylacetic acid ethyl ester, butyryl-acetic acid ethyl ester and isobutyryl-acetic acid ethyl ester.

Amines:

Methylamine, ethylamine, propylamine, isopropylamine, butylamine, allylamine, propargylamine, 1-hydroxyethyl-amine-2, 1,3-dihydroxyisopropylamine, cyclohexylamine, benzylamine, 4-chlorobenzylamine, 3,4-dimethoxybenzylamine and phenethylamine.

According to a preferred embodiment of the present invention, R is hydrogen, alkyl of one to six carbon atoms and especially one to three carbon atoms, or benzyl, R'' is straight or branched chain alkyl of one to six carbon atoms, and especially of one to three carbon atoms, said alkyl interrupted by one oxygen atom, furfuryl, alkenyl of two to six carbon atoms, and especially two or three carbon atoms or alkinyl of two to six carbon atoms, and especially two or three carbon atoms, and R''' is phenyl substituted by cyano or by cyano and a member selected from the group consisting of cyano, nitro, amino, acylamino of one to two carbon atoms, hydroxyl, acyloxy of one to two carbon atoms, one or two alkyl moieties of one to four carbon atoms, one or two alkoxy moieties of one to four carbon atoms, and one or two halogen atoms, and especially cyano, cyano and chloro or cyano and nitro.

The compounds of the present invention are particularly useful by virtue of the below set forth effects demonstrated in in vivo animal tests:

1. On parenteral, oral and perlingual administration, the compounds effect a distinct and long-lasting dilation of the coronary vessels. This effect on the coronary vessels is intensified by a simultaneous nitrate-like heart-relieving effect.

They influence and/or modify the heart metabolism in the sense of a saving of energy.

2. The excitability of the stimulus-forming and excitation-conducting system within the heart is reduced, so that an anti-fluttering effect demonstrable in therapeutic doses results.

3. The tone of the smooth muscle of the vessels is greatly reduced under the action of the compounds. This vascularspasmolytic action can occur in the entire vascular system or can manifest itself to a more or less isolated extend in circumscribed vascular regions (such as for example the central nervous system).

4. The compounds reduce the blood pressure of normal tonic and hypertonic animals and can thus be used as anti-hypertensive agents.

5. The compounds possess strong muscular-spasmolytic actions which manifest themselves on the smooth muscle of the gastric and intestinal tract, the urogenital tract and the respiratory system.

The following non-limitative examples more particularly illustrate the present invention.

EXAMPLE 1

2,6-Dimethyl-4-(4'-cyanophenyl)-1,4-dihydropyridine-3,5-dicarbo-xylic Acid Methyl Ester.

After boiling a solution of 10 g 4-cyanobenzaldehyde, 16 cc acetoacetic acid methyl ester and 6 cc ammonia in 100 cc methanol for several hours, there are obtained yellow crystals (18 g) of m.p. 228°C (methanol).

The following compounds were produced in analogous manner:

a. 2,6-dimethyl-4-(3'-cyanophenyl)-1,4-dihydropyridine-3,5-di-carboxylic acid diethyl ester of m.p. 152°–154°C, from 3-cyanobenzaldehyde, acetoacetic acid ethyl ester and ammonia.

b. 2,6-dimethyl-4-(3'-cyano-4'-chlorophenyl)-1,4-dihydropyridine-3,5-dicarboxylic acid dimethyl ester of m.p. 167°C, from 3-cyano-4-chlorobenzaldehyde, acetoacetic acid methyl ester and ammonia.

c. 2,6-dimethyl-4-(3'-cyanophenyl)-1,4-dihydropyridine-3,5-di-carboxylic acid diisopropyl ester of m.p. 188°C, from 3-cyanobenzaldehyde, acetoacetic acid isopropyl ester and ammonia.

d. 2,6-dimethyl-4-(3'-cyanophenyl)-1,4-dihydropyridine-3,5-di-carboxylic acid diallyl ester of m.p. 171°C, from 3-cyanobenzaldehyde, acetoacetic acid allyl ester and e. 4-(2'-cyanophenyl)-2,6-dimethyl-1,4-dihydropyridine-di-carboxylic acid dimethyl ester, from 2-cyanobenzaldehyde, acetoacetic acid methyl ester and ammonia.

f. 4-(2'-cyanophenyl)-2,6-dimethyl-1,4-dihydropyridine-di-carboxylic acid diethyl ester, from 2-cyanobenzaldehyde, acetoacetic acid ethyl ester and ammonia.

EXAMPLE 2

1,2,6-trimethyl-4-(3'-cyanophenyl)-1,4-dihydropyridine-3,5-di-carboxylic acid diethyl ester.

10 g 3-cyanobenzaldehyde, 20 cc acetoacetic acid ethyl ester and 6 g methylamine hydrochloride are heated in 40 cc pyridine at about 90°C for one hour. The mixture is poured into water, filtered off with suction and the product recrystallized from 200 cc methanol. White crystals of m.p. 109°C (17 g).

The following compounds were produced in an analogous manner:

a. 1,2,6-trimethyl-4-(2'-cyanophenyl)-1,4-dihydropyridine-3,5-dicarboxylic acid dimethyl ester of m.p. 226°C, from 2-cyanobenzaldehyde, acetoacetic acid methyl ester and methylamine hydrochloride.

b. 1,2,6-trimethyl-4-(3'-cyanophenyl)-1,4-dihydropyridine-3,5-dicarboxylic acid di-(β-propoxyethylester) of m.p. 106°C, from 3-cyanobenzaldehyde, acetoacetic acid-β-propoxyethyl-ester and methylamine hydrochloride.

c. 1,2,6-trimethyl-4-(3'-cyano-4'-chlorophenyl)-1,4-dihydro-pyridine-3,5-dicarboxylic acid diallyl ester of m.p. 115°C, from 3-cyano-4-chlorobenzaldehyde, acetoacetic acid allyl ester and methylamine hydrochloride.

d. 1-methyl-2,6-diethyl-4-(3'-cyano-4'-chlorophenyl)-1,4-dihydro-pyridine-3,5-dicarboxylic acid diethyl ester of m.p. 85°C, from 3-cyano-4-chlorobenzaldehyde, propionly propionyl acetate and methylamine hydrochloride.

e. 1,2,6-trimethyl-4-(2'-cyanophenyl)-1,4-dihydropyridine-3,5-dicarboxylic acid diethyl ester of m.p. 160°C, from 2-cyanobenzaldehyde, acetoacetic acid ethyl ester and methylamine hydrochloride.

f. 1,2,6-trimethyl-4-(2'-cyanophenyl)-1,4-dihydropyridine-3,5-dicarboxylic acid diisopropyl ester of m.p. 124°C, from 2-cyanobenzaldehyde, acetoacetic acid isopropyl ester and methylamine hydrochloride.

1,2,6-trimethyl-4-(2'-cyanophenyl)-1,4-dihydropyridine-3,5-dicarboxylic acid diallyl ester of m.p. 180°C, from 2-cyanobenzaldehyde, acetoacetic acid allyl ester and methylamine hydrochloride.

h. 1,2,6-trimethyl-4-(3'-nitro-4'-cyanophenyl)-1,4-dihydro-pyridine-3,5-dicarboxylic acid dimethyl ester of m.p. 152°C, from 3-nitro-4-cyanobenzaldehyde, acetoacetic acid methyl ester and methylamine hydrochloride.

i. 1,2,6-trimethyl-4-(3'-cyanophenyl)-1,4-dihydropyridine-3,5-dicarboxylic acid difurfuryl ester of m.p. 84°C, from 3-cyanobenzaldehyde, acetoacetic acid furfuryl ester and j. 1,2,6-trimethyl-4-(3'-cyano-4'-chlorophenyl)-1,4-dihydro-pyridine-3,5-dicarboxylic acid dipropargyl ester of m.p. 107°C, from 3-cyano-4-chlorobenzaldehyde, acetoacetic acid propargyl ester and methylamine hydrochloride.

EXAMPLE 3

N-benzyl-2,6-dimethyl-4-(4'-cyanophenyl)-1,4-dihydropridine-3,5-dicarboxylic acid di-n-butyl ester.

5 g 4-cyanobenzaldehyde are heated with 20 cc aceto-acetic acid n-butyl ester and 5 cc benzylamine in 30 cc pyridine at 90° to 100°C for three hours, the mixture is poured into ice-water, suction-filtered, and 10 g yellow-white crystals of m.p. 116°C are obtained from methanol.

The present invention also includes pharmaceutical compositions which comprise one of the above set forth compounds according to the present invention in combination with a pharmaceutically acceptable non-toxic inert diluent or carrier. Said pharmaceutical compositions are made according to the techniques which are per se well known in the art. Any of the usual carriers, diluents, excipients and the like may be utilized according to standard techniques. Such tablets, capsules, dragees, solutions, suspensions and the like form part of the present invention. Also a part of the present invention is the method of effecting coronary action in humans and animals which comprises administering to a human or animal in need thereof a therapeutionally effective amount of a compound of the present invention until amelioration of the condition occurs.

What is claimed is:

1. A pharmaceutical composition comprising a coronary dilating effective amount of a compound of the formula:

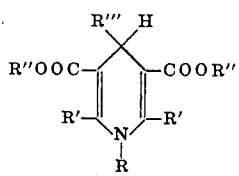

wherein
R is hydrogen, saturated or unsaturated, straight, branched or cyclic alkyl of one to six carbon atoms, unsubstituted or substituted by hydroxyl or alkoxy of one to three carbon atoms, or benzyl or phenethyl unsubstituted or substituted in the aryl moiety by 1, 2 or 3 members selected from the group consisting of one to three alkoxy moieties of one to three carbon atoms, one or two alkyl moieties of one to three carbon atoms and one or two halogen atoms;
R' is straight or branched chain alkyl of one to four carbon atoms;
R'' is straight, branched, cyclic, saturated or unsaturated alkyl of one to six carbon atoms and said alkyl interrupted by one or two oxygen atoms or said alkyl substituted by hydroxyl; and
R''' is cyanophenyl or cyanophenyl substituted by nitro or halogen, and
an inert pharmaceutically acceptable carrier therefor.

2. A pharmaceutical composition according to claim 1, wherein
R is hydrogen, alkyl of one to six carbon atoms; and
R'' is straight or branched chain alkyl of one to six carbon atoms, said alkyl interrupted by one oxygen atom, furfuryl, alkenyl of two to six carbon atoms or alkinyl of two to six carbon atoms.

3. A pharmaceutical composition according to claim 1, wherein

R is hydrogen, methyl or benzyl;
R' is methyl or ethyl;
R'' is methyl, ethyl, isopropyl, butyl, β-propoxyethyl, furfuryl, allyl or propargyl; and
R''' is cyanophenyl, cyano-chlorophenyl or nitrocyanophenyl.

4. A pharmaceutical composition according to claim 1, containing 2,6-dimethyl-4-(4'-cyanophenyl)-1,4-dihydropyridine-3,5-dicarboxylic acid methyl ester.

5. A pharmaceutical composition according to claim 1, containing 2,6-dimethyl-4-(3'-cyanophenyl)-1,4-dihydropyridine-3,5-dicarboxylic acid diethyl ester.

6. A pharmaceutical composition according to claim 1, containing 2,6-dimethyl-4-(3'-cyano-4'-chlorophenyl)-1,4-dihydro-pyridine-3,5-dicarboxylic acid dimethyl ester.

7. A pharmaceutical composition according to claim 1, containing 2,6-dimethyl-4-(3'-cyanophenyl)-1,4-dihydropyridine-3,5-dicarboxylic acid diisopropyl ester.

8. A pharmaceutical composition according to claim 1, containing 2,6-dimethyl-4-(3'-cyanophenyl)-1,4-dihydropyridine-3,5-dicarboxylic acid diallyl ester.

9. A pharmaceutical composition according to claim 1, containing 4-(2'-cyanophenyl)-2,6-dimethyl-1,4-dihydropyridine-dicarboxylic acid dimethyl ester.

10. A pharmaceutical composition according to claim 1, containing 4-(2'-cyanophenyl)-2,6-dimethyl-1,4-dihydropyridine-dicarboxylic acid diethyl ester.

11. A pharmaceutical composition according to claim 1, containing 1,2,6-trimethyl-4-(3'-cyanophenyl)-1,4-dihydropyridine-3,5-dicarboxylic acid diethyl ester.

12. A pharmaceutical composition according to claim 1, containing 1,2,6-trimethyl-4-(2'-cyanophenyl)-1,4-dihydropyridine-3,5-dicarboxylic acid dimethyl ester.

13. A pharmaceutical composition according to claim 1, containing 1,2,6-trimethyl-4-(3'-cyanophenyl)-1,4-dihydropyridine-3,5-dicarboxylic acid di-(β-propoxyethylester).

14. A pharmaceutical composition according to claim 1, containing 1,2,6-trimethyl-4-(3'-cyano-4'-chlorophenyl)-1,4-dihydropyridine-3,5-dicarboxylic acid diallyl ester.

15. A pharmaceutical composition according to claim 1, containing 1-methyl-2,6-diethyl-4-(3'-cyano-4'-chlorophenyl)-1,4-dihydropyridine-3,5-dicarboxylic acid diethyl ester.

16. A pharmaceutical composition according to claim 1, containing 1,2,6-trimethyl-4-(2'-cyanophenyl)-1,4-dihydropyridine-3,5-dicarboxylic acid diethyl ester.

17. A pharmaceutical composition according to claim 1, containing 1,2,6-trimethyl-4-(2'-cyanophenyl)-1,4-dihydropyridine-3,5-dicarboxylic acid diisopropyl ester.

18. A pharmaceutical composition according to claim 1, containing 1,2,6-trimethyl-4-(2'-cyanophenyl)-1,4-dihydropyridine-3,5-dicarboxylic acid diallyl ester.

19. A pharmaceutical composition according to claim 1, containing 1,2,6-trimethyl-4-(3'-nitro-4'-cyanophenyl)-1,4-di-hydropyridine-3,5-dicarboxylic acid dimethyl ester.

20. A pharmaceutical composition according to claim 1, containing 1,2,6-trimethyl-4-(3'- cyanophenyl)-1,4-dihydropyridine-3,5-dicarboxylic acid difurfuryl ester.

21. A pharmaceutical composition according to claim 1, containing 1,2,6-trimethyl-4-(3'-cyano-4'-chlorophenyl)-1,4-di-hydropyridine-3,5-dicarboxylic acid dipropargyl ester.

22. A pharmaceutical composition according to claim 1, containing N-benzyl-2,6-dimethyl-4-(4'-cyanophenyl)-1,4-dihydro-pyridine-3,5-dicarboxylic acid di-n-butyl ester.

23. The method of effecting coronary dilation which comprises administering to an animal in need thereof a coronary dilating effective amount of a compound of the formula:

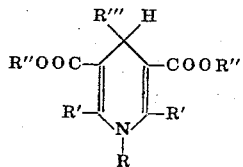

wherein

R is hydrogen, saturated or unsaturated, straight, branched or cyclic alkyl of one to six carbon atoms, unsubstituted or substituted by hydroxyl or alkoxy of one to three carbon atoms, or benzyl or phenethyl unsubstituted or substituted in the aryl moiety by 1, 2 or 3 members selected from the group consisting of one to three alkoxy moieties of one to three carbon atoms, one or two alkyl moieties of one to three carbon atoms and one or two halogen atoms;

R' is straight or branched chain alkyl of one to four carbon atoms;

R'' is straight, branched, cyclic, saturated or unsaturated alkyl of one to six carbon atoms and said alkyl interrupted by one or two oxygen atoms or said alkyl substituted by hydroxyl; and R''' is cyanophenyl or cyanophenyl substituted by nitro or halogen.

24. The method according to claim 23, wherein

R is hydrogen, methyl or benzyl;

R' is methyl or ethyl;

R'' is methyl, ethyl, isopropyl, butyl, β-propoxyethyl, furfuryl, allyl or propargyl; and R''' is cyanophenyl, cyano-chlorophenyl or nitrocyanophenyl.

25. The method according to claim 23, wherein the compound is 2,6-dimethyl-4-(4'-cyanophenyl)-1,4-dihydropyridine-3,5-dicarboxylic acid methyl ester.

26. The method according to claim 23, wherein the compound is 2,6-dimethyl-4-(3'-cyanophenyl)-1,4-dihydropyridine-3,5-dicarboxylic acid diethyl ester.

27. The method according to claim 23, wherein the compound is 4-(2'-cyanophenyl)-2,6-dimethyl-1,4-dihydropyridine-dicarboxylic acid dimethyl ester.

28. The method according to claim 23, wherein the compound is 4-(2'-cyanophenyl)-2,6-dimethyl-1,4-dihdyropyridine-dicarboxylic acid diethyl ester.

29. The method according to claim 23, wherein the compound is 1,2,6-trimethyl-4-(2'-cyanophenyl)-1,4-dihydropyridine-3,5-dicarboxylic acid diethyl ester.

30. The method according to claim 23, wherein the compound is 1,2,6-trimethyl-4-(2'-cyanophenyl)-1,4-dihdyropyri-dine-3,5-dicarboxylic acid dimethyl ester.

* * * * *